United States Patent [19]

Caron et al.

[11] Patent Number: 4,753,111

[45] Date of Patent: Jun. 28, 1988

[54] NON-OBSTRUCTIVE THERMODYNAMIC FLUID FLOW METER

[75] Inventors: Hubert Caron; Dimitri Petrov, both of Montreal, Canada

[73] Assignee: Allied-Signal Inc., Morris Township, N.J.

[21] Appl. No.: 932,125

[22] Filed: Nov. 19, 1986

[30] Foreign Application Priority Data

Dec. 23, 1985 [CA] Canada .................................. 498519

[51] Int. Cl.⁴ .............................................. G01F 1/68
[52] U.S. Cl. ...................................................... 73/204
[58] Field of Search .............................. 73/118.2, 204

[56] References Cited

U.S. PATENT DOCUMENTS

| | | | |
|---|---|---|---|
| 3,603,147 | 9/1971 | Dorman | 73/204 |
| 3,928,800 | 12/1975 | Strenglein | 73/204 X |
| 4,043,195 | 8/1977 | Hunting . | |
| 4,244,217 | 1/1981 | Ledbetter . | |
| 4,334,186 | 6/1982 | Sasayama et al. | 73/204 X |
| 4,335,605 | 6/1982 | Boyd . | |
| 4,404,638 | 9/1983 | Yada et al. . | |
| 4,616,505 | 6/1986 | Jouwsma | 73/204 |
| 4,649,745 | 3/1987 | Kondo et al. | 73/204 |
| 4,665,745 | 5/1987 | Ina et al. | 73/204 |

Primary Examiner—Herbert Goldstein
Attorney, Agent, or Firm—Howard G. Massung

[57] ABSTRACT

A fluid flow meter using a pair of temperature-variable resistance elements as detectors. Both elements are exposed to the fluid flow and supplied with a series of current pulses. The pulses supplied to one element, the reference element, are of very short duration so as to have no appreciable heating effect; the pulses supplied to the other element are of longer duration and are controlled so as to maintain this element at a fixed temperature differential above the other element, which remains at fluid temperature. The pulse width of the longer duration pulses is a measure of the flow rate of the fluid. Since the relationship between heat dissipated in the element and fluid flow varies with fluid temperature, the voltage pulses across the reference element are used as a measure of fluid temperature to compensate for this variation in calculating the exact fluid flow rate.

4 Claims, 2 Drawing Sheets

NON-OBSTRUCTIVE THERMODYNAMIC FLUID FLOW METER

This invention relates to a fluid flow meter and, in particular, a fluid flow meter of the non-obstructive thermodynamic type in which the energy necessary to replace the heat lost from a transducer in contact with the fluid is measured as an indication of the fluid flow.

Such flow meters are described in Canadian Patent No. 1,187,719, issued May 28, 1985 in the names of Petrov and Goldstein. This patent uses a pair of nickel foil sensors mounted flush with the inside wall of a pipe to be contacted by the fluid flowing through the pipe. A third sensor, used as a heater is mounted close to but electrically insulated from one of the sensors. The pair of sensors are connected in a bridge circuit and a closed loop completed from the bridge output via an amplifier to the heater to maintain one of the sensors at a fixed temperature differential above the temperature of the other. At zero flow rate of the fluid the bridge is balanced. As fluid flows through the pipe, heat is drained away from one of the sensors and the additional power required to bring the bridge back into balance is a measure of the flow rate. Since the relationship between the heat dissipated in the sensor and fluid flow varies with temperature of the fluid a separate measurement of fluid temperature is made and supplied to a processor to provide appropriate compensation to the measured flow rate to provide an accurate indication of the flow rate.

Although this known flow meter provides a useful and accurate flow meter with a fast response time it has a disadvantage that it is analog in operation and requires the provision of separate analog-to-digital converters for signal processing. Further, the superimposed heater and sensor element must be accurately aligned and results in a slower response time than using the sensor by itself.

The present invention relates to a fluid flow meter of the general type discussed above in which the detecting elements are energized by pulses of current and the output signal is in digital form for immediate processing. It is of compact form, economical in construction and has a fast response time of the order of 50 μsec.

Specifically, the invention relates to a fluid flow meter, comprising: means defining a path for fluid and a pair of elements exhibiting a temperature-variable resistance positioned to contact fluid in the path. A separate current supply is provided for each element, the current supply to one element providing sufficient energy to maintain it at a higher temperature than the other element. Means are provided to compare the voltage across each element and to control the energy supplied to the one element by its current supply to maintain the one element at a fixed temperature difference above the other element, whereby parameters of the current give a measure of the flow rate.

In its method aspect, the invention relates to a method of determining fluid flow through a pipe comprising: positioning a pair of elements having temperature-variable resistance to contact fluid flowing in the pipe; supplying separate trains of current pulses to the elements; varying the width of pulses in the current supplied to one of the elements to maintain its temperature a fixed amount above the temperature of the other element; and utilizing the pulse width of the current supplied to the one element as a measure of the flow rate of the fluid.

A specific embodiment of the invention will now be described in conjunction with the accompanying drawings, in which.

DESCRIPTION OF THE PREFERRED EMBODIMENT

Figure 1:
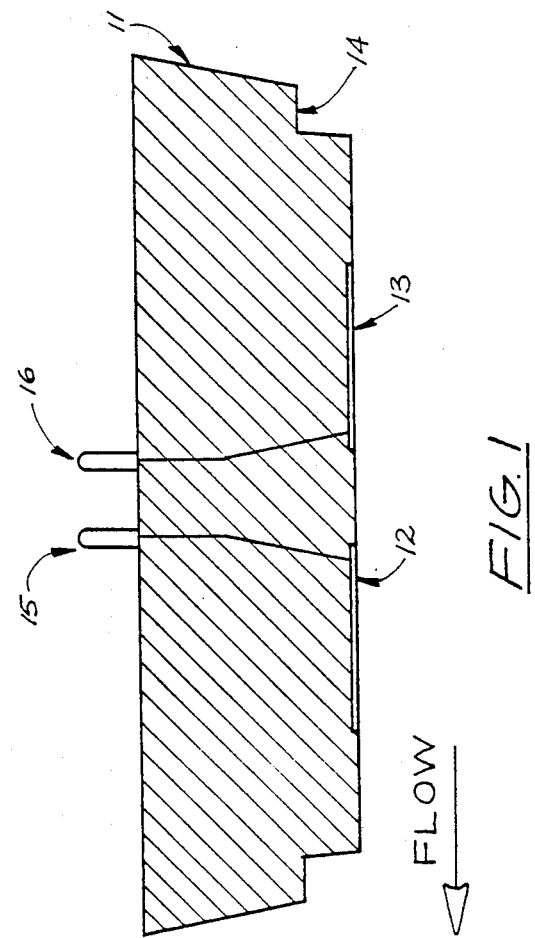
FIG. 1 is a cross-sectional view of the flow meter.

The structure of the flow meter 10 is shown in FIG. 1. A block 11, of material such as epoxy, has two identical nickel foil resistance temperature detector elements 12 and 13 mounted on a polyamide film on one side thereof. The block is adapted to be inserted in a pipe wall so that the detector elements contact the fluid flowing along the inner pipe wall without obstructing it and with shoulder 14 providing a sealing surface. Terminals 15 and 16 are connected to one edge of each element with the opposite edge of each element being grounded.

The general operation of such thermodynamic detectors is that sufficient power is supplied to detector element 12 to maintain a constant temperature differential between detector element 12 and detector element 13. Detector element 13 is always maintained at the temperature of the fluid. As the liquid flow increases, more power is necessary to maintain this differential, due to the greater amount of heat lost from detector element 12 to the liquid. The power dissipated in detector 12 is, thus, a measure of the flow rate.

Figure 2:
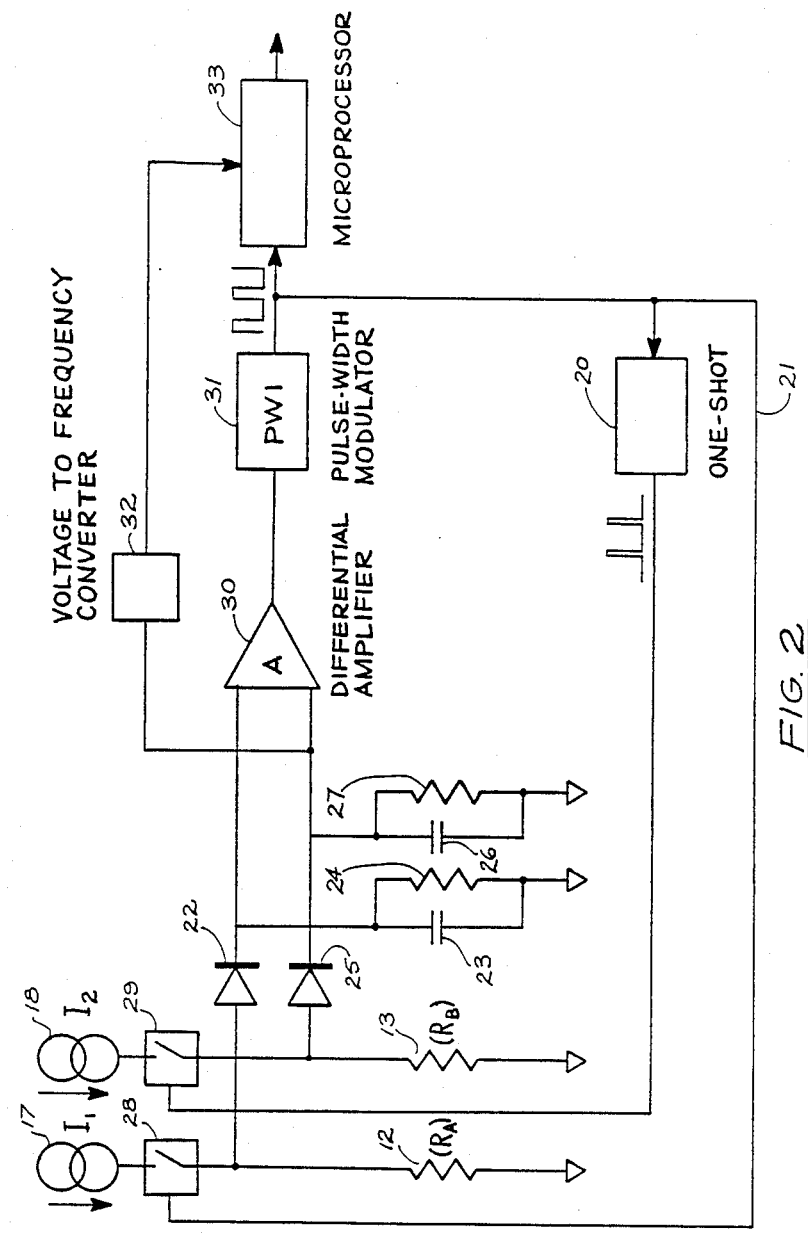
FIG. 2 is a schematic diagram of the control circuit.

FIG. 2 shows the drive circuitry of the flow meter of the present invention. Element 12 is connected to a constant current source 17 by means of a fast acting switch 28. Switch 28 is controlled by a series of pulses from a pulse width modulator 31 via conductor 21. Element 13 is connected to a further constant current source 18 via a further fast acting switch 29. Switch 29 is controlled by a series of narrow pulses from a monostable circuit 20. The constant current sources are commercially available semiconductor circuits and the fast acting switches can be of any conventional type.

Thus, element 13 is supplied with a series of narrow current pulses and element 12 is supplied with another series of current pulses, which need not be at the same repetition rate. The pulses on conductor 21 have a varying pulse width which, generally, will be greater than the pulse width of the pulses from monostable circuit 20. Each current pulse supplied to elements 12 and 13 produces a voltage pulse across the detector element which is sensed by two peak detector circuits. The peak detector circuit for element 12 consists of diode 22 and a parallel circuit of capacitor 23 and resistor 24 connected to ground. Similarly, the peak detector for element 13 consists of diode 25 and a parallel circuit of capacitor 26 and resistor 27 also connected to ground. The peak voltage across each of the elements 12 and 13 appears on capacitors 23 and 26 and is compared in differential amplifier 30 which provides a difference voltage indicative of the difference in the peak voltage readings across elements 12 and 13. The difference voltage from amplifier 30 is used to control a pulse width modulator 31 which, in turn, supplies the variable width pulse train on conductor 21.

The pulses from monostable circuit 20 are sufficiently narrow to avoid any significant heating of element 13. The wider pulses on conductor 21 do provide a significant heating effect on element 12 and, hence, the amplitude of the peak voltage across element 12 differs from that across element 13 and the closed loop including differential amplifier 30 functions to maintain this voltage at a constant difference.

As discussed in Canadian Patent No. 1,187,719, the power required to maintain a constant temperature difference between elements 12 and 13 is not only a function of fluid flow, but also a function of fluid temperature. A measure of fluid temperature is the voltage across capacitor 26. This voltage is supplied to a voltage-to-frequency converter 32 to provide an output signal which may then be used to obtain a temperature-compensated measurement of the difference in temperature, the difference in temperature being representative of fluid flow.

In the preferred embodiment the signal from voltage to frequency converter is fed to a microprocessor 33 which uses this information, as well as the basic flow information in the pulse-width modulator output, to determine fluid flow. The duty cycle is determined by measuring pulsewidth with the help of an internal or external clock. This is in contrast to known circuits using DC analog drive for element 12 which require an analog to digital conversion prior to flow computation.

The circuit of this invention has the additional advantage that the power dissipated in element 12 is linearly related to the duty cycle of $I_1$:

$$P = D \times I_1^2 \times R_A$$

where D is the duty cycle of the output of the pulse width modulator, $I_1$ and $R_A$ (resistance of element 12) are assumed constant. The assumption that the resistance $R_A$ is constant is valid under conditions of steady state, constant flow temperature and very large loop gain. Previously known circuits using variable amplitude current drive to heat element 12 operate by deriving the square of the measured current to obtain a measure of power, and hence flow.

Various changes in the disclosed embodiment will be clear to those skilled in the art. Typically, the temperature difference between the sensors is maintained at 5° C. giving an output signal even when the flow rate is zero.

What is claimed is:

1. A fluid flow meter comprising:
   means defining a path for fluid;
   a pair of detector elements exhibiting temperature-variable resistivity and positioned to contact fluid in said path;
   a pair of constant current sources each being in series with one of the detector elements via a switching means;
   a pair of peak voltage detectors connected one to each detector element to sense the maximum voltage across that element;
   a differential amplifier having inputs connected to each peak voltage detector;
   a pulse generator connected to the output of the differential amplifier producing a series of pulses having a pulse width proportional to the difference in voltage across the peak voltage detectors;
   means coupling the output of the pulse generator to one of the switching means;
   a monostable circuit connected to the output of the pulse generator to provide a series of short pulses;
   means coupling the output of the monostable circuit to the other of said switching means;
   whereby the width of pulses from said pulse generator is a measure of the flow rate of fluid.

2. A meter as set forth in claim 1 wherein said detector elements are identical.

3. A fluid flow meter as in claim 2 further including processing means coupled to the output of said pulse generator to provide a display of said flow rate.

4. A fluid flow meter as in claim 3 further including a voltage-to-frequency converter connected to the peak voltage detector which responds to said other detector element, the output of said voltage-to-frequency converter being connected to said processing means whereby the peak voltage detector supplies a measure of the fluid temperature to compensate for variations in the displayed result.

* * * * *